United States Patent
Gilakala et al.

(10) Patent No.: US 11,296,987 B2
(45) Date of Patent: Apr. 5, 2022

(54) CONGESTION MANAGEMENT MECHANISM

(71) Applicant: Hewlett Packard Enterprise Development LP, Houston, TX (US)

(72) Inventors: Vijay Chakravarthy Gilakala, Bangalore Karnataka (IN); Aravind Badiger, Bangalore Karnataka (IN); Ravindhar Uppada, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/852,863

(22) Filed: Apr. 20, 2020

(65) Prior Publication Data

US 2021/0328925 A1    Oct. 21, 2021

(51) Int. Cl.
| | | |
|---|---|---|
| *G01R 31/08* | (2020.01) | |
| *H04L 47/12* | (2022.01) | |
| *H04L 47/2425* | (2022.01) | |
| *H04L 47/33* | (2022.01) | |
| *G06F 15/173* | (2006.01) | |
| *H04L 45/00* | (2022.01) | |
| *H04L 41/0213* | (2022.01) | |
| *H04L 49/00* | (2022.01) | |

(52) U.S. Cl.
CPC ........ *H04L 47/12* (2013.01); *G06F 15/17331* (2013.01); *H04L 41/0213* (2013.01); *H04L 45/54* (2013.01); *H04L 47/2433* (2013.01); *H04L 47/33* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 9,503,382 B2 | 11/2016 | Decusatis et al. | |
| 10,015,096 B1 | 7/2018 | Singh | |
| 10,904,367 B2* | 1/2021 | Goel | ............. H04L 47/15 |
| 10,965,586 B2* | 3/2021 | Goel | ............. H04L 47/122 |

(Continued)

OTHER PUBLICATIONS

Cumulus, "Converge your network with explicit congestion notification", available online at <https://cumulusnetworks.com/blog/explicit-congestion-notification/>, 2019, 8 pages.

(Continued)

*Primary Examiner* — Gerald A Smarth
(74) *Attorney, Agent, or Firm* — Trop, Pruner & Hu, P.C.

(57) ABSTRACT

A system to facilitate resolving traffic congestion in a network switching fabric is described. The system includes a processor and a machine readable medium storing instructions that, when executed, cause the processor to receive a notification from a virtual connect switch indicating that a congestion condition has been detected in remote direct memory access (RDMA) over Converged Ethernet (RoCE) data traffic flowing from a first end point to a second end point via a first of a plurality of paths between the first end point and the second end point, identify a second of the plurality of paths between the first end point and the second end point and modify the RoCE data traffic to flow from the first end point to the second end point via the second path.

20 Claims, 5 Drawing Sheets

(56) References Cited

U.S. PATENT DOCUMENTS

| | | | |
|---|---|---|---|
| 10,986,425 B2* | 4/2021 | Sindhu | H04L 49/10 |
| 2015/0200802 A1* | 7/2015 | Sawal | H04L 45/22 |
| | | | 370/228 |
| 2015/0341273 A1* | 11/2015 | Naouri | H04L 47/822 |
| | | | 370/231 |
| 2017/0171099 A1 | 6/2017 | Shpiner et al. | |
| 2018/0219797 A1* | 8/2018 | Sen | H04L 67/34 |
| 2019/0013965 A1* | 1/2019 | Sindhu | G06F 13/4282 |
| 2019/0044861 A1 | 2/2019 | Wandler et al. | |
| 2019/0342199 A1* | 11/2019 | Hurson | H04L 67/1097 |
| 2019/0379582 A1* | 12/2019 | Johnsen | H04L 45/245 |
| 2019/0379598 A1* | 12/2019 | Johnsen | H04L 45/24 |
| 2019/0379610 A1* | 12/2019 | Srinivasan | H04L 47/11 |
| 2020/0053018 A1* | 2/2020 | White | H04L 47/11 |
| 2020/0218684 A1* | 7/2020 | Sen | G06F 3/0604 |
| 2020/0236052 A1* | 7/2020 | Srinivasan | H04L 45/60 |
| 2020/0244580 A1 | 7/2020 | Gilakala et al. | |
| 2020/0280518 A1* | 9/2020 | Lee | H04L 47/30 |
| 2020/0334195 A1* | 10/2020 | Chen | H04L 67/1097 |
| 2020/0396170 A1* | 12/2020 | Gafni | H04L 47/30 |

OTHER PUBLICATIONS

Mellanox, "Introduction to Resilient RoCE", available online at <https://community.mellanox.com/s/article/introduction-to-resilient-roce—faq#jive_content_id_What_is_Resilient_RoCE>, Dec. 5, 2018, 4 pages.

Priority-based flow control (PFC), IEEE standard 802.1Qbb.

Ramakrishnan et al., "The Addition of Explicit Congestion Notification (ECN) to IP", Request for Comments: 3168, Network Working Group, Sep. 2001, pp. 1-63.

Zhu et al., "Congestion Control for Large-Scale RDMA Deployments", SIGCOMM '15, ACM, Aug. 17-21, 2015, pp. 523-536.

IEEE, "IEEE Standard for Local and metropolitan area networks-Media Access Control (MAC) Bridges and Virtual Bridged Local Area Networks—Amendment 17: Priority-based Flow Control," IEEE Std 802.1Qbb-2011. Sep. 30, 2011, pp. 1-40.

Ramakrishnan, et al., "The Addition of Explicit Congestion Notification (ECN) to IP", retrieved from internet <https://datatracker.ietf.org/doc/html/rfc3168>. Sep. 2001, 63 pages.

* cited by examiner

CONGESTION MANAGEMENT MECHANISM

BACKGROUND

Direct memory access (DMA) is a computer system feature that enables a hardware subsystem (or device) to directly access a main system (or host) memory independent of a central processing unit (CPU). Similarly, Remote DMA (or RDMA) is a direct memory access (e.g., reading from or writing to) from the memory of one computer system into the memory of another computer system independent of either CPU or operating system. RDMA is achieved by implementing a network stack in a network adapter and relieving the operating system of the transfer, thus eliminating CPU involvement.

RDMA over Converged Ethernet (RoCE) is a network protocol that allows remote direct memory access (RDMA) over an Ethernet (or a layer 3) network. There are two RoCE versions, RoCE v1 and RoCE v2. RoCE v1 is an Ethernet link layer protocol and hence allows communication between any two hosts in the same Ethernet broadcast domain. RoCE v2 is an internet layer protocol, which means that RoCE v2 packets can be routed.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
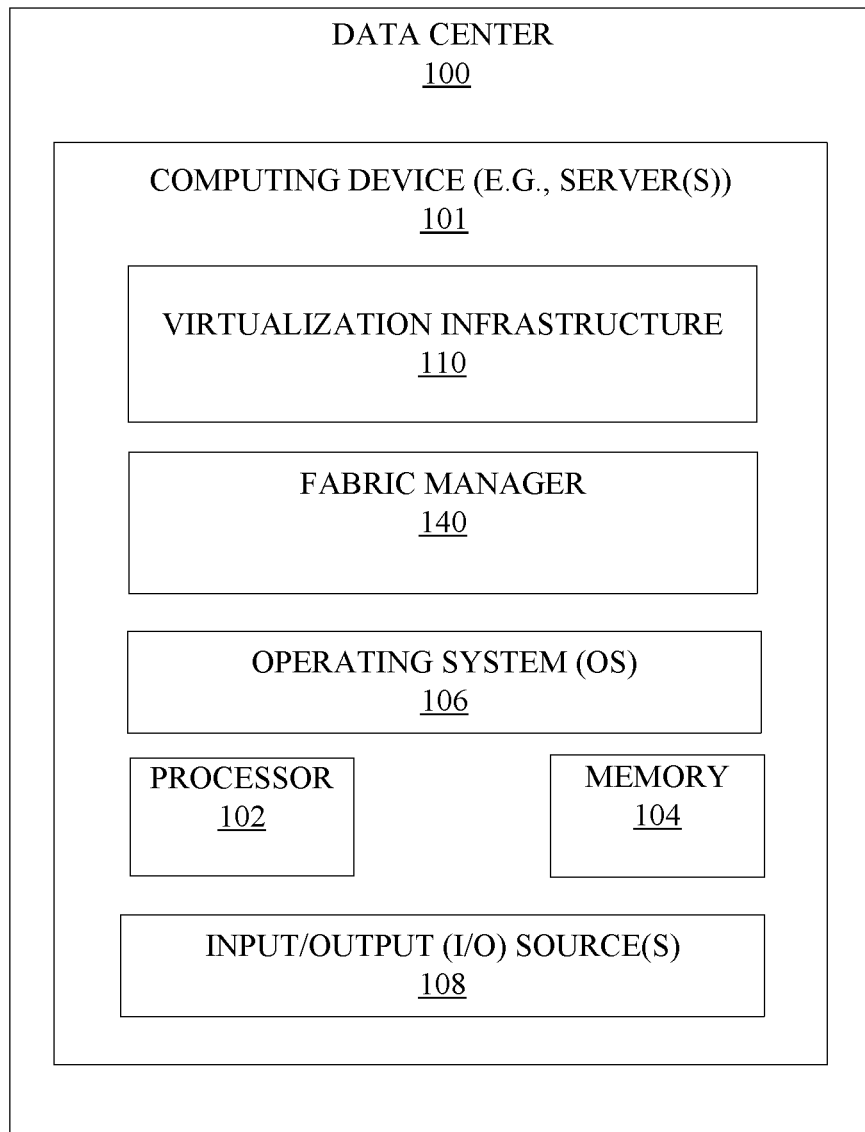
FIG. 1 illustrates one embodiment of a system employing a data center.

RDMA requires a lossless transmission that is achieved by employing mechanisms in a layer 3 network, such as explicit congestion notification (ECN). ECN allows end-to-end notification, including intermediate layer 3 devices, of network congestion without dropping packets. ECN is a feature that may be used between two ECN-enabled end-points when supported the underlying network infrastructure. ECN assists networks by providing notifications regarding the congestion in a layer 3 network to reduce the packet loss by making the transmitting device lower the transmission rate until the network has recovered from congestion. Whenever layer 3 congestion is detected, a congestion indicator (e.g., within a packet) is transmitted from a receiver to a source device, where the source device echoes the destination upon receiving the ECN. A problem with ECN is that the implementation requires configuration on both endpoints and on all intermediate layer 3 devices for RDMA to be lossless at layer 3. Thus, any intermediate device that does not support ECN may introduce the possibility of a RDMA being lossy at that device.

In embodiments, a mechanism is provided to resolve traffic congestion in a network switching fabric. In such embodiments, a fabric manager detects RoCE congestion in layer 3 network traffic flowing from a first end point to a second end point via a first path. The fabric manager subsequently determines one or more alternative paths between the first end point to the second end point and modifies the traffic to flow from the first end point to the second end point via one of the alternative paths.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

According to one embodiment, computing device 101 implements a virtualization infrastructure 110 to provide virtualization of a plurality of host resources (or virtualization hosts) included within data center 100. In one embodiment, virtualization infrastructure 110 is implemented via a virtualized data center platform (including, e.g., a hypervisor), such as VMware vSphere or Linux Kernel-based Virtual Machine. However other embodiments may implement different types of virtualized data center platforms. Computing device 101 also facilitates operation of a network switching fabric. In one embodiment, the network switching fabric is a software-defined transport fabric that provides connectivity between the host resources within virtualization infrastructure 110.

Figure 2:
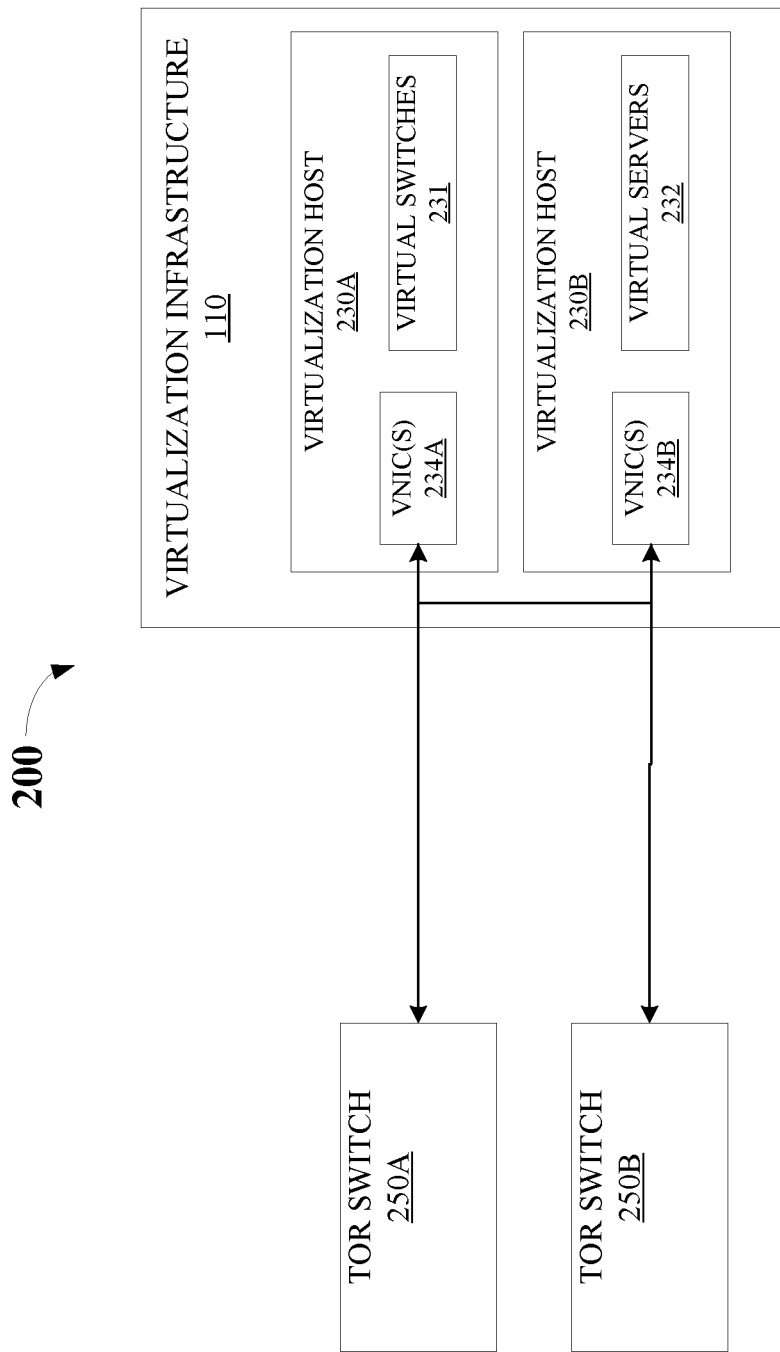
FIG. 2 is a block diagram illustrating one embodiment of a network switching fabric.

FIG. 2 is a block diagram illustrating one embodiment of a network switching fabric (or fabric) 200. As shown in FIG. 2, fabric 200 includes a plurality of top of rack (TOR) switches 250 (e.g., 250A & 250B) coupled to virtualized hosts 230 within virtualization infrastructure 110. TOR switches 250 are network switches that handle operations, including layer 2 and layer 3 frame and packet forwarding and data center 100 bridging. In one embodiment, a virtualization host 230 may provide switching resources. In such an embodiment, a TOR switch 250 may be coupled to one or more virtual switches via one or more virtual network interface cards (VNICs) 234. For instance, TOR switch 250A may be coupled to virtual switches 231 via VNICs 234A within host 230A. In such an embodiment, a TOR switch 250 and switch virtualization host 230A may include a plurality of physical switching ports.

In a further embodiment, each switch port may be coupled to a neighboring device (e.g., switch port neighbors). A TOR switch 250 may also be coupled to one or more servers within a host 230 via VNICs 234. For example, TOR switch 250B may be coupled to virtual servers 232 within host 230B via VNICs 234B. In one embodiment, one or more of virtual servers (or compute units) 232 at host 230B may be coupled to virtual switches 231 at host 230A. Thus, one or more physical devices at host 230B may be switch port neighbors with switch ports at host 230A.

Figure 3:
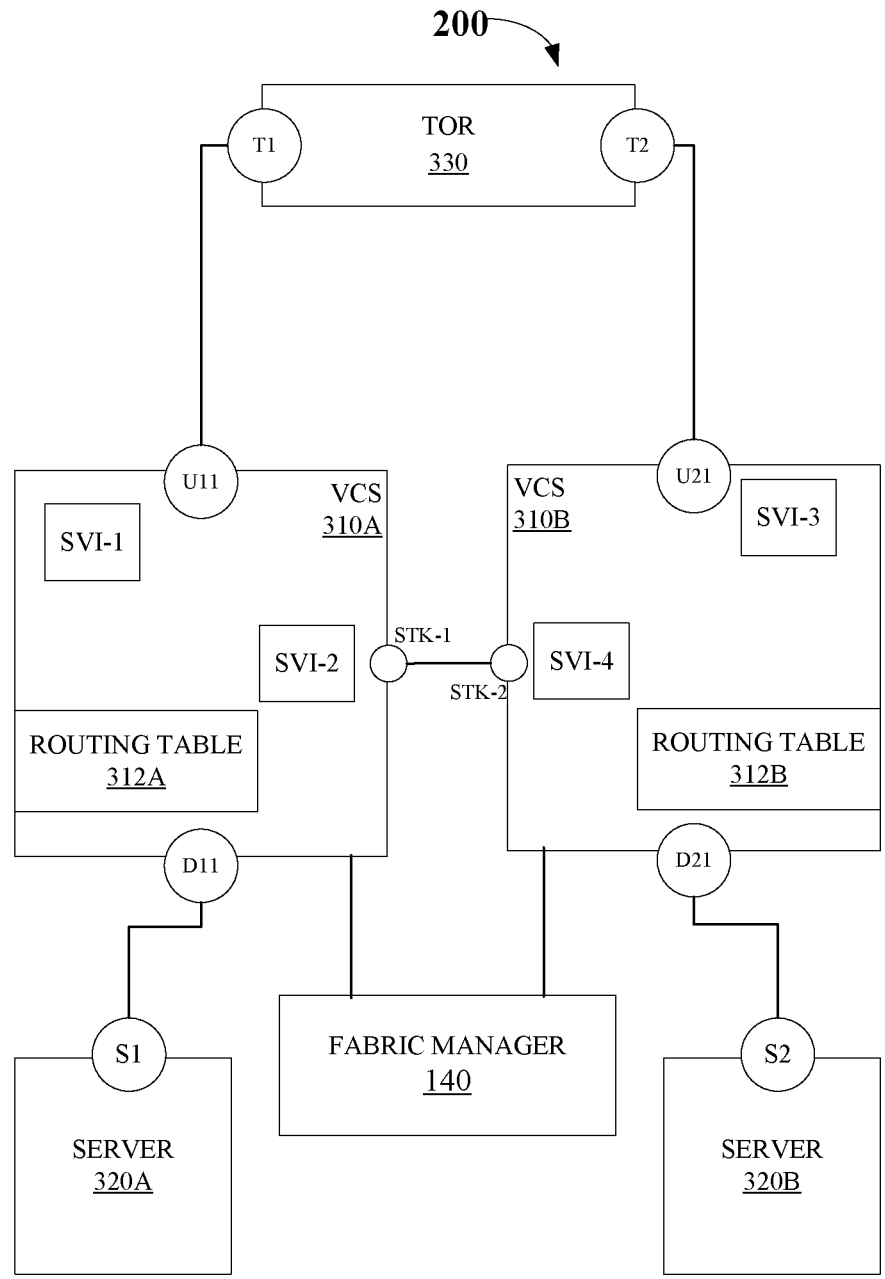
FIG. 3 is a block diagram illustrating another embodiment of a network switching fabric.

Referring back to FIG. 1, a fabric manager 140 is included within computing device to manage fabric 200. Fabric manager 140 sets up and manages connections between devices within fabric 200. FIG. 3 is a block diagram illustrating another embodiment of a fabric 200 including fabric manager 140. As shown in FIG. 3, fabric 200 includes virtual connect switches (VCSs) 310A and 310B coupled as endpoints STK-1 and STK-2, respectively.

In one embodiment VCSs 310A and 310B are implemented in a stacked configuration. As defined herein, a stacked configuration comprises two or more network switches having characteristics of a single switch, while maintaining the port capacity of the sum of the combined switches. In a further embodiment, VCSs 310A and 310B implement a layer 3 configuration to transfer data via RoCE v2. In such an embodiment, switch virtual interfaces (SVIs) are created (e.g., SVI 1 and SVI 2 at VCS 310A and SVI 3 and SVI 4 at VCS 310B). In yet a further embodiment, the layer configuration may be performed manually or via dynamic layer 3 protocols. VCSs 310A and 310B each include a routing table 312 (e.g., 312A and 312B) that comprises information regarding the topology of fabric 200, as well as a list of the routes to particular destinations within fabric 200.

Fabric 200 also includes servers 320A and 320B having downlink ports connected to VCSs 310A and 310B, respectively. Additionally, VCSs 310A and 310B are coupled to a TOR switch 330, which may in turn be coupled to another network, not shown. As shown in FIG. 3, RoCE v2 traffic flowing between server 320A and 320B in one of two paths: S1-D11-SVI 1-U11-T1-T2-U21-SVI 3-D21-S2; or S1-D11-SVI 2-STK1-STK2-SVI 4-D21-S2. The traffic would take one of the paths depending on the routing tables 312A and 312B. For example, RoCE v2 traffic that is received from port D11 is routed to the SVI 1 interface/port U11 and vice-versa in VCS 310A. Similarly the traffic received from port U21 is routed to SVI 3 interface/port D21 and vice-versa in VCS 310B.

Figure 4:
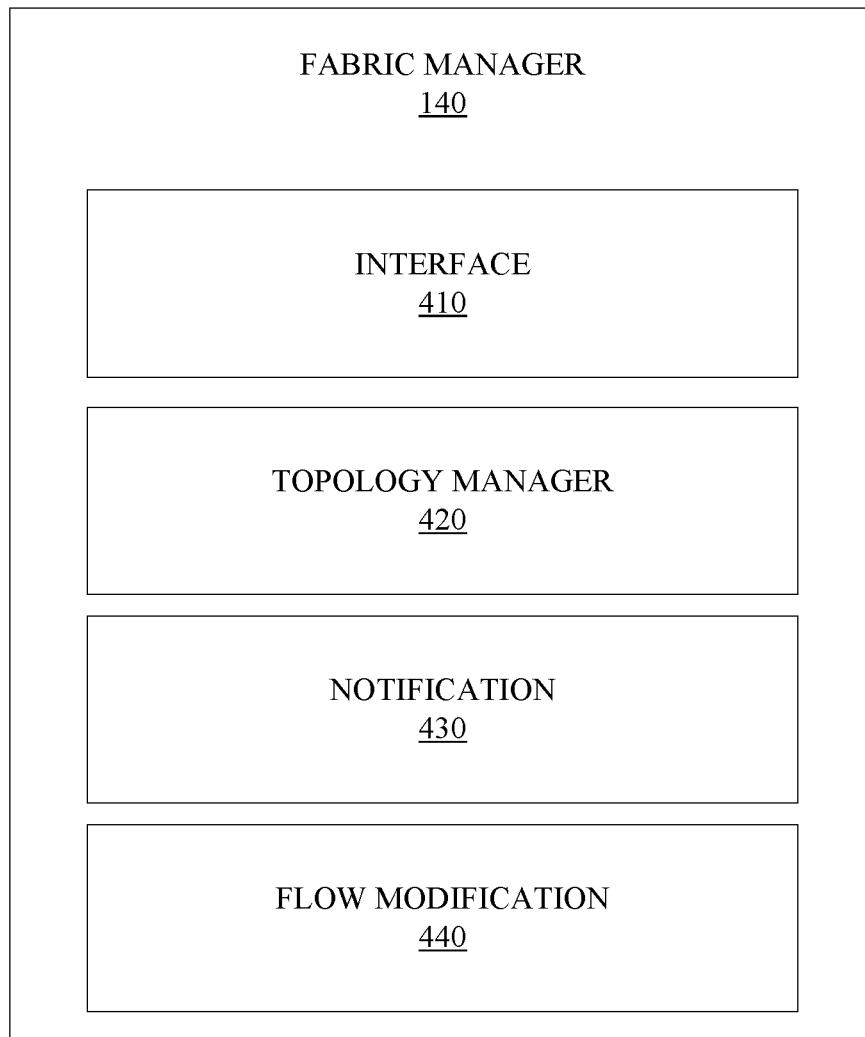
FIG. 4 is a block diagram illustrating one embodiment of a fabric manager.

Whenever congestion is detected through ECN in the layer 3 network over port U 11 on VCS 310A, layer 3 path T1, T2 is congested. Thus due to ECN, the traffic will not be transmitted and will instead be forwarded to queues/buffers of port U11. According to one embodiment, VCSs 310A and 310B are configured to transmit ECNs to fabric manager 140. FIG. 4 is a block diagram illustrating one embodiment of fabric manager 140. As shown in FIG. 4, fabric manager 140 includes an interface 410 that is configured to communicate with virtualization infrastructure 110 regarding VCSs 310 and servers 320. In one embodiment, interface 410 is implemented as a Representational State Transfer (REST) application program interface (API) for fabric manager 140.

Fabric manager 140 also includes a topology manager 420 to manage the topology of network switching fabric 200. According to one embodiment, topology manager 420 performs a topology analysis of switching fabric 200. In such an embodiment, topology manager 420 maintains configuration information for fabric 200, which is a mapping of device connections within fabric 200. For example, the configuration information may include information regarding all of the physical connections between VCSs 310, servers 320, as well as TOR switch 330.

Fabric manager 140 also includes a notification engine 430 to monitor RoCE v2 traffic within fabric 200. For example, fabric manager 140 may monitor RoCE v2 transfers between server 320A and server 320B to detect an occurrence of congestion in the layer 3 network. In one embodiment, congestion is detected at VCSs 310A and 310B using ECN. In this embodiment, VCSs 310A and 310B transmit an ECN to fabric manager 140. In a further embodiment, fabric manager 140 receives an ECN from a VCS 310 via a Simple Network Management Protocol (SNMP). However in other embodiments. ECNs may be received via other types of protocols.

A flow modification engine 440 is also included within fabric manager 140 to modify a RoCE v2 transfer path (e.g., between server 320A and server 320B) upon receiving an ECN. In one embodiment, flow modification engine 440 identifies a plurality alternative paths between the endpoints (e.g., STK-1 and STK-2) for the transfer and selects an alternative path from the plurality of alternative paths. In such an embodiment, the alternative path may selected by modifying one or more of routing tables 312 to update the transfer route to the alternate path. The routing table modification may be triggered by disabling a routing protocol at an interface at which the congestion is observed. For example, if the congestion is reported on SVI-1, the fabric manager 140 dynamically disables the routing protocol to direct the traffic over an alternate interface (e.g., SVI-2).

In an alternative embodiment, flow modification engine 440 selects an alternative path by modifying the cost of the alternate route so that RoCE v2 traffic is routed through alternate path and avoid the congested path in the given layer 3 topology. In this embodiment, each routing table entry includes Network ID, Subnet mask, Next hop, Outgoing Interface and a metric. In a further embodiment, the metric indicates a minimum number of hops associated with the network. In still a further embodiment, the metric value is decreased so that the alternate path is selected in case of congestion detected on the interface to which the packets are currently routed.

Figure 5:
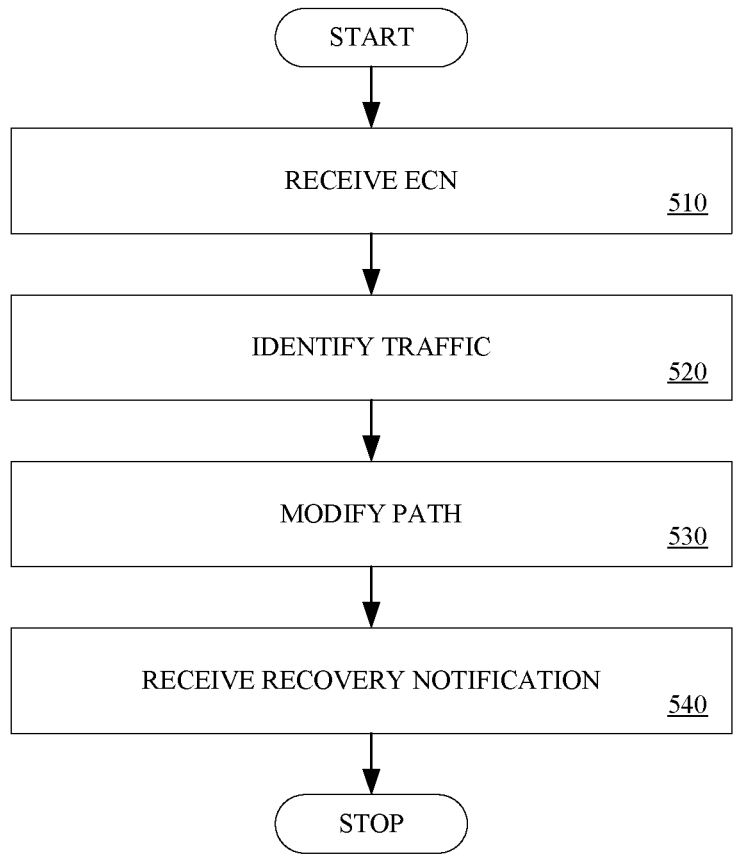
FIG. 5 is a flow diagram illustrating one embodiment of a process for relieving congestion in a network switching fabric.

FIG. 5 is a flow diagram illustrating one embodiment of a process performed by fabric manager 140 to relieve congestion in a network switching fabric. At processing block 510, an ECN is received from a VCS. As described above, the VCS holds the traffic at port queues/buffers of port U11 upon detecting congestion. At processing block 520, the RoCE v2 traffic is identified. In one embodiment, the priority flow control (PFC) priority of the traffic is also identified. PFC is a mechanism that prevents frame loss that is due to congestion. In a further embodiment, the priority is configured using RoCE configuration commands.

At processing block 530, the traffic path is modified by selecting an alternative path. As discussed above, the path may be modified by either modifying routing tables or a cost of the alternate route. At processing block 540, a notification is received indicating a recovery of the layer 3 congestion condition. In one embodiment, the original path may subsequently be reused for the transfer upon detection of congestion at the alternate path.

The above described mechanism may be used to select a congestion free path/layer 3 route that results good response time with respect to RoCEv2 traffic across servers in a network. Additionally, the mechanism voluntarily recovers from congestion in layer 3 networks without user intervention. Thus, a data center administrator is not required to take any actions during traffic congestions.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate a resolution of traffic congestion in a network switching fabric, comprising:
   a processor; and
   a non-transitory machine-readable medium storing fabric manager instructions executable on the processor to:
      receive an explicit congestion notification (ECN) from a virtual connect switch indicating that a congestion condition has been detected in remote direct memory access (RDMA) over Converged Ethernet (RoCE) internet layer data packet traffic flowing from a first end point to a second end point via a first path of a plurality of paths between the first end point and the second end point;
      identify a second path of the plurality of paths between the first end point and the second end point, wherein the first path is through a first switch virtual interface of the virtual connect switch, and the second path is through a second switch virtual interface of the virtual connect switch; and
      modify a route of the RoCE internet layer data packet traffic to flow from the first end point to the second end point via the second path.

2. The system of claim 1, wherein the fabric manager instructions are executable on the processor to modify the route of the RoCE internet layer data packet traffic by programming a routing table within the virtual connect switch.

3. The system of claim 1, wherein the fabric manager instructions are executable on the processor to identify a priority associated with the first path.

4. The system of claim 3, wherein the fabric manager instructions are executable on the processor to modify the route of the RoCE internet layer data packet traffic by modifying a cost associated with the second path in accordance with the priority associated with the first path.

5. The system of claim 1, wherein the fabric manager instructions are executable on the processor to receive a second ECN indicating that the congestion condition in the first path has been alleviated.

6. The system of claim 5, wherein the ECN and the second ECN are received via a Simple Network Management Protocol (SNMP).

7. The system of claim 1, wherein the fabric manager instructions are executable on the processor to modify the route of the RoCE internet layer data packet traffic by disabling a routing protocol at the first switch virtual interface.

8. A method to facilitate a resolution of traffic congestion in a network switching fabric, comprising:
   receiving, at a traffic manager executed in a computer system, a notification (ECN) from a virtual connect switch indicating that a congestion condition has been detected in remote direct memory access (RDMA) over Converged Ethernet (RoCE) internet layer data packet traffic flowing from a first end point to a second end point via a first path of a plurality of paths between the first end point and the second end point;

identifying, by the traffic manager, a second path of the plurality of paths between the first end point and the second end point, wherein the first path is through a first switch virtual interface of the virtual connect switch, and the second path is through a second switch virtual interface of the virtual connect switch; and modifying, by the traffic manager, a route of the RoCE internet layer data packet traffic to flow from the first end point to the second end point via the second path.

9. The method of claim 8, wherein modifying the route of the RoCE internet layer data packet traffic comprises programming a routing table within the virtual connect switch.

10. The method of claim 8, further comprising identifying a priority associated with the first path.

11. The method of claim 10, wherein modifying the route of the RoCE internet layer data packet traffic comprises modifying a cost associated with the second path in accordance with the priority associated with the first path.

12. The method of claim 8, further comprising receiving a second ECN indicating that the congestion condition in the first path has been alleviated.

13. The method of claim 12, wherein the ECN and the second ECN are received via a Simple Network Management Protocol (SNMP).

14. The method of claim 8, wherein modifying the route of the RoCE internet layer data packet traffic comprises disabling a routing protocol at the first switch virtual interface.

15. A non-transitory machine-readable medium storing instructions which, when executed, cause a computer system to:

receive an explicit congestion modification (ECN) from a virtual connect switch indicating that a congestion condition has been detected in remote direct memory access (RDMA) over Converged Ethernet (RoCE) internet layer data packet traffic flowing from a first end point to a second end point via a first path of a plurality of paths between the first end point and the second end point;

identify a second path of the plurality of paths between the first end point and the second end point, wherein the first path is through a first switch virtual interface of the virtual connect switch, and the second path is through a second switch virtual interface of the virtual connect switch; and modify a route of the RoCE internet layer data packet traffic to flow from the first end point to the second end point via the second path.

16. The non-transitory machine-readable medium of claim 15, wherein the instructions when executed cause the computer system to modify the route of the RoCE internet layer data packet traffic by programming a routing table within the virtual connect switch.

17. The non-transitory machine-readable medium of claim 15, wherein the instructions when executed cause the computer system to identify a priority associated with the first path.

18. The non-transitory machine-readable medium of claim 17, wherein the instructions when executed cause the computer system to modify the route of the RoCE internet layer data packet traffic by modifying a cost associated with the second path in accordance with the priority associated with the first path.

19. The non-transitory machine-readable medium of claim 15, wherein the instructions when executed cause the computer system to receive a second ECN indicating that the congestion condition in the first path has been alleviated.

20. The non-transitory machine-readable medium of claim 19, wherein the ECN and the second ECN are received via a Simple Network Management Protocol (SNMP).

* * * * *